United States Patent [19]

Glogan et al.

[11] Patent Number: 5,231,436
[45] Date of Patent: Jul. 27, 1993

[54] COMPACT CAMERA WITH FLIP OPEN FLASH UNIT

[75] Inventors: David J. Glogan; Douglas H. Pearson, both of Rochester, N.Y.

[73] Assignee: Eastman Kodak Company, Rochester, N.Y.

[21] Appl. No.: 853,230

[22] Filed: Mar. 16, 1992

[51] Int. Cl.$^5$ .................................... G03B 15/03
[52] U.S. Cl. .......................... 354/149.11; 354/126; 354/187; 354/193
[58] Field of Search .............. 354/149.11, 126, 187, 354/193

[56] References Cited

U.S. PATENT DOCUMENTS

| | | | |
|---|---|---|---|
| 1,435,646 | 11/1922 | Kroedel | 354/193 |
| 1,870,620 | 8/1932 | Fuerst | 354/193 |
| 1,937,053 | 11/1933 | Bornmann et al. | 354/193 |
| 2,177,770 | 10/1939 | Goldhammer | |
| 3,750,549 | 8/1973 | Waaske | |
| 4,219,265 | 8/1980 | Waaske | 354/187 |
| 4,264,172 | 4/1981 | Miyagawa et al. | 354/187 |
| 4,277,157 | 7/1981 | Miyagawa et al. | 354/187 |
| 4,280,762 | 7/1981 | Prochnow | 354/187 |
| 4,336,986 | 6/1982 | Prochnow | 354/187 |
| 4,365,884 | 12/1982 | Knapp | 354/187 |
| 4,557,571 | 12/1985 | Reibl | 354/149.11 |
| 4,597,656 | 7/1986 | Yamashita | 354/193 |
| 4,601,561 | 7/1986 | Yamashita | 354/149.11 |
| 4,983,999 | 1/1991 | Meisezahl et al. | 354/149.11 |

*Primary Examiner*—Monroe H. Hayes
*Attorney, Agent, or Firm*—Roger A. Fields

[57] ABSTRACT

A compact camera has a rectractable objective lens carrier that is associated with a flip open flash unit to move to an extended taking position as the flash unit is moved to an opened or unfolded position and to move to a retracted storage position as the flash unit is moved to a closed or folded position. A locking device is biased to engage the lens carrier substantially when the lens carrier is in its taking position to lock the lens carrier in that position, and can be disengaged from the lens carrier to permit the lens carrier to be moved to its storage position. A single cam is connected with the flash unit for disengaging the locking device from the lens carrier responsive to movement of the flash unit out of its opened position, for forcibly holding the locking device apart from the lens carrier substantially when the flash unit is in its closed position, and for releasing the locking device responsive to movement of the flash unit to its opened position to permit the locking device to engage with the lens carrier substantially when the lens carrier is in its taking position.

3 Claims, 4 Drawing Sheets

COMPACT CAMERA WITH FLIP OPEN FLASH UNIT

CROSS-REFERENCE TO A RELATED APPLICATION

Reference is made to commonly assigned, copending application Ser. No. 07/838,120 entitled COMPACT CAMERA WITH LENS COVER, and filed Feb. 18, 1992 in the name of Dennis E. Baxter.

BACKGROUND OF THE INVENTION

1. Field of the Invention

The invention relates generally to the field of photography, and in particular to compact folding cameras.

2. Description of the Prior Art

The classical folding camera is one in which a lens carrier for an objective lens is translatable along the len's optical axis between a storage position retracted in the camera body and a picture-taking position extended from the camera body. Typically, a lens cover is pivotally connected to the camera body for swinging movement between a closed or folded position in front of the objective lens when the lens carrier is in its storage position and an opened or unfolded position removed from the objective lens when the lens carrier is in its taking position. See commonly assigned U.S. Pat. No. 4,557,571, issued Dec. 10, 1985, for example.

In a folding camera such as disclosed in U.S. Pat. No. 4,557,571, when the lens cover is swung from its opened position to its closed position, it pushes the lens carrier inwardly of the camera body to translate the lens carrier from its taking position to its storage position. Conversely, when the lens cover is swung from its closed position to its opened position, spring means is free to push the lens carrier outwardly of the camera body to translate the lens carrier from its storage position to its taking position. No locking device is provided, however, for locking the lens carrier in its taking position.

On interest, therefore, is U.S. Pat. No. 4,365,884, issued Dec. 18, 1982, which shows a folding camera wherein the lens carrier is associated with the lens cover to extend to the taking position as the lens cover is swung to its opened position and to retract to the storage position as the lens cover is swung to its closed position, except that a locking device is provided for locking the lens carrier in its taking position. Specifically, the lens carrier includes an integral pin which, when the lens carrier is moved to its taking position, passes beneath a latching lever to come to rest at the far side of the latching lever, where it is retained by the latching lever. An intricate linkage is needed, however, to separate the latching lever from the pin to allow the lens carrier to be returned to its storage position.

SUMMARY OF THE INVENTION

According to the invention, there is provided an improved photographic camera wherein a flip open unit is manually movable between an opened position and a closed position, a retractable objective lens carrier is associated with the flip open unit to move the an extended taking position as the flip open unit is moved to its opened position and to move a retracted storage position as the flip open unit is moved to its closed position, and locking means is based to engage the lens carrier substantially when the lens carrier is in its taking position to lock the lens carrier in that position and can be disengaged from the lens carrier to permit the lens carrier to be moved to its storage position, and wherein the improvement comprises:

single cam means is connected with the flip open unit for disengaging the locking means from the lens carrier responsive to movement of the flip open unit out of its opened position, for forcibly holding the locking means apart from the lens carrier substantially when the flip open unit is in its closed position, and for releasing the locking means responsive to movement of the flip open unit to its opened position to permit the locking means to engage with the lens carrier substantially when the lens carrier is in its taking position.

DETAILED DESCRIPTION OF THE PREFERRED EMBODIMENT

Figure 1:
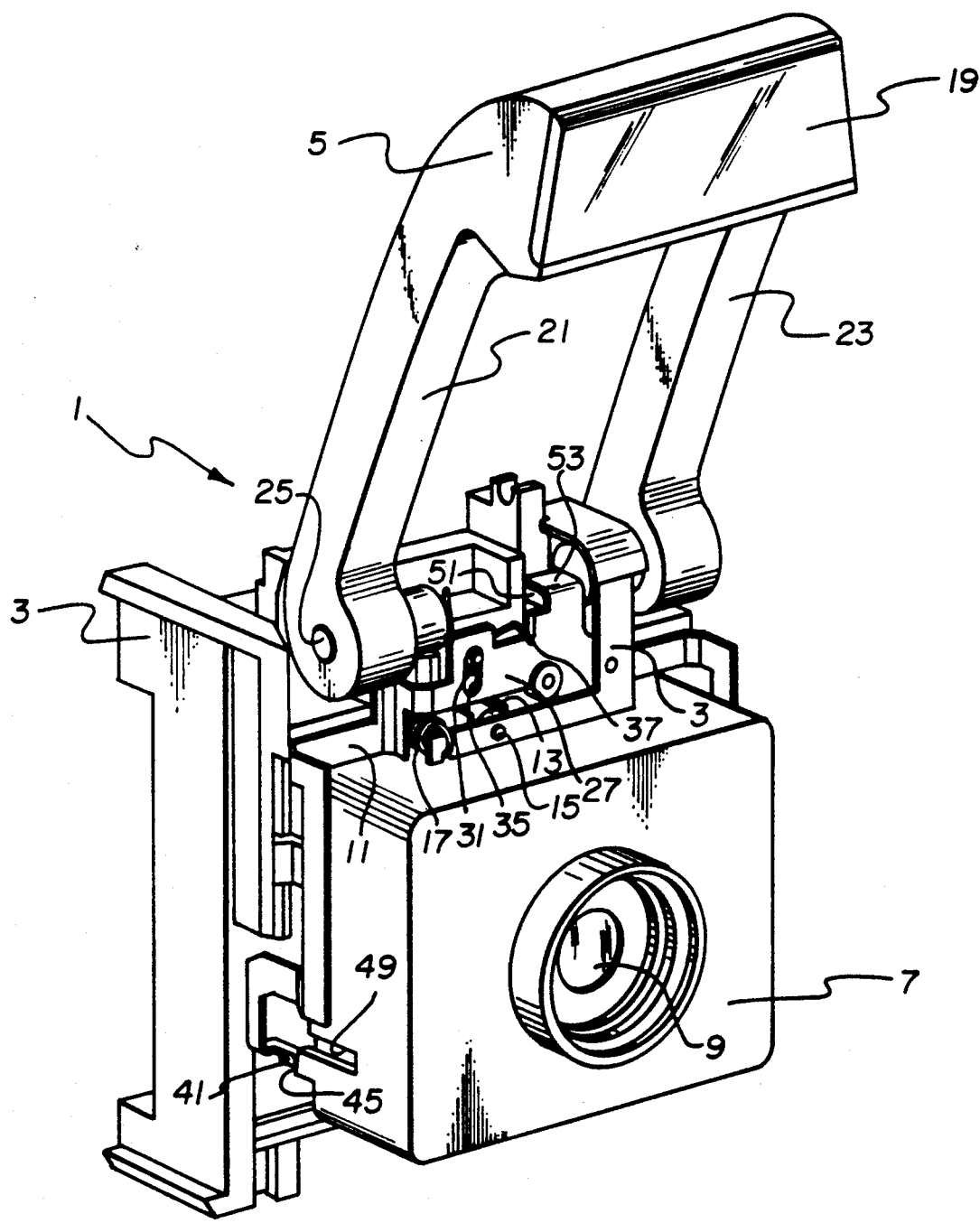
FIG. 1 is a front outside perspective view of camera apparatus according to a preferred embodiment of the invention, showing a flip open flash unit in an opened or unfolded position and a retractable objective lens carrier in an extended taking position.

The invention is disclosed as being embodied in a compact 35 mm camera with a flip open flash unit. Because such photographic cameras have become well known as typified by U.S. Pat. No. 4,557,571, issued Dec. 10, 1985, this description is directed in particular to camera elements forming part of or cooperating directly with the preferred embodiment. It is to be understood, however, that camera elements not specifically shown or described may take various forms known to persons of ordinary skill in the art.

U.S. Pat. No. 4,557,571 and application Ser. No. 07/838,120, referenced above, are incorporated in this application for disclosure purposes.

Referring now to the drawings, FIGS. 1, 2, 3 and 4 show camera apparatus 1 comprising a frame portion 3, a flip open flash unit 4, a retractable carrier 7 for an objective lens 9, and a locking device 11 for the lens carrier.

The lens carrier 7 includes a bearing 13 that receives a shaft 15, fixed to the frame portion 3, to support the lens carrier for translation outwardly and inwardly of the frame portion, along the lens optical axis (not shown) between an extended taking position and a retracted storage position. See FIGS. 1–4. An extension spring 17 having opposite ends anchored to the frame portion 3 and the lens carrier 7 urges the lens carrier to its taking position, and known stops (not shown) prevent translation of the lens carrier outwardly beyond that position. Alternatively, the lens carrier 7 can be supported for movement between its taking and storage positions as shown in U.S. Pat. No. 4,557,571.

The flash unit 5 has a flash emission window 19 and a pair of spaced rigid arms 21 and 23. The rigid arms 21 and 23 are pivotally connected to the frame portion 3 by means of respective coaxial pins 25 (only one shown) to support the flash unit for manually swinging movement about the coaxial pins between a closed or folded position in front of the lens carrier 7, when the lens carrier is in its retracted storage position, and an opened or unfolded position elevated from the lens carrier, when the lens carrier is in its extended taking position. As the flash unit 5 is manually swung from its opened position to its closed, against the bias of the extension spring 17, its rigid arms 21 and 23 push against the lens carrier 7 to push the lens carrier further into the frame portion 3 from its taking position to its storage position. See FIGS. 1-4.

Figure 2:
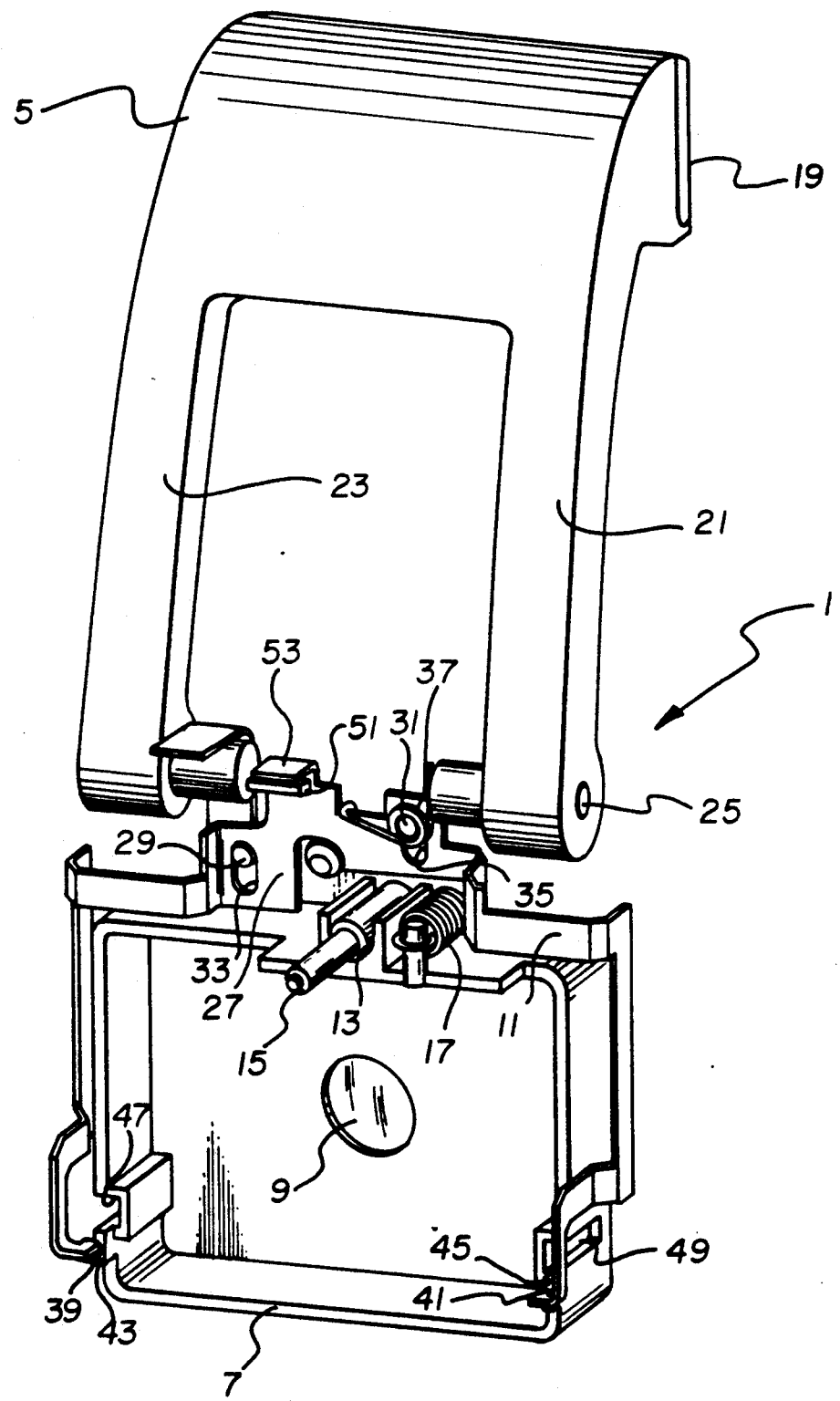
FIG. 2 is a front inside perspective view similar to FIG. 1.
Figure 3:
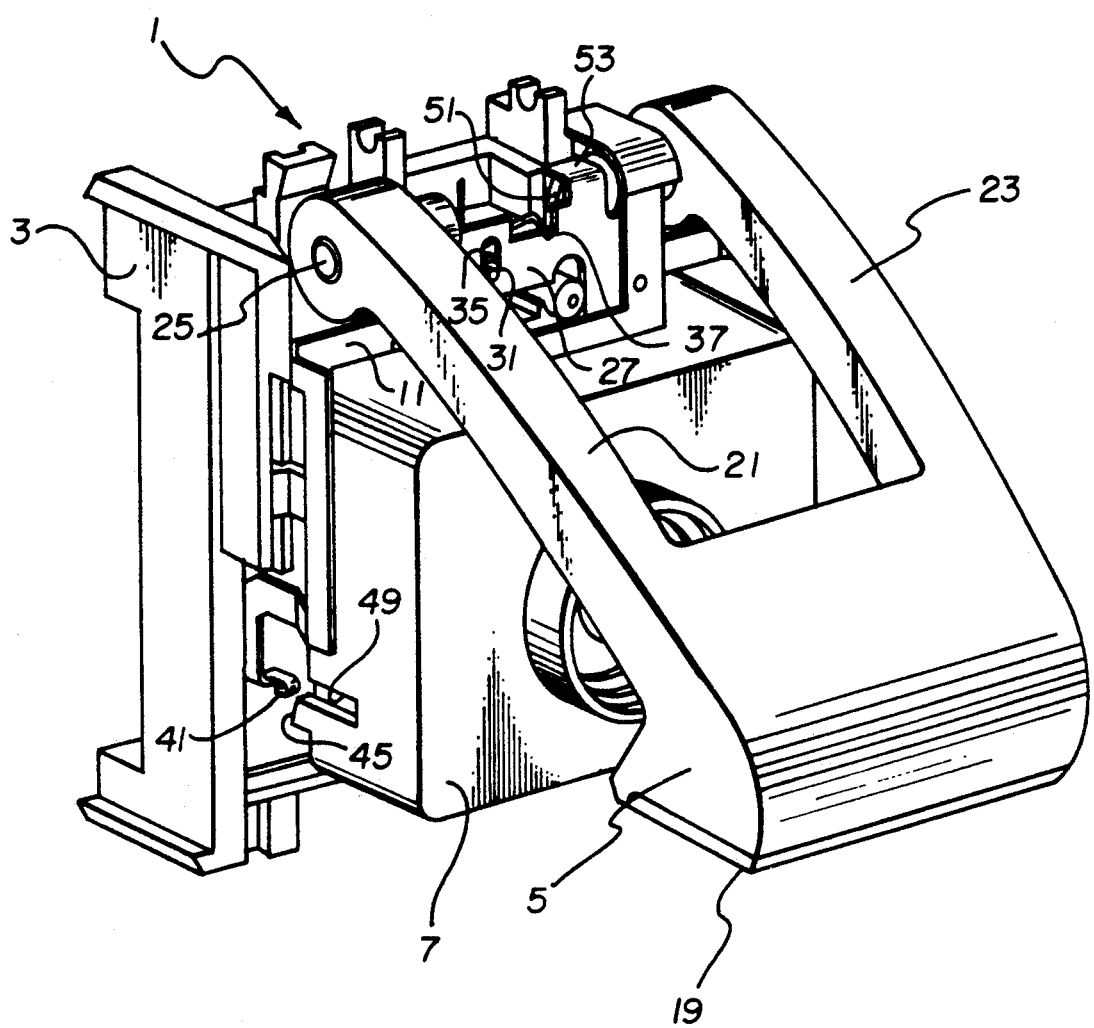
FIG. 3 is a front outside perspective view of the camera apparatus, showing the flash unit being moved to a closed or folded position and the lens carrier being moved to a retracted storage position.
Figure 4:
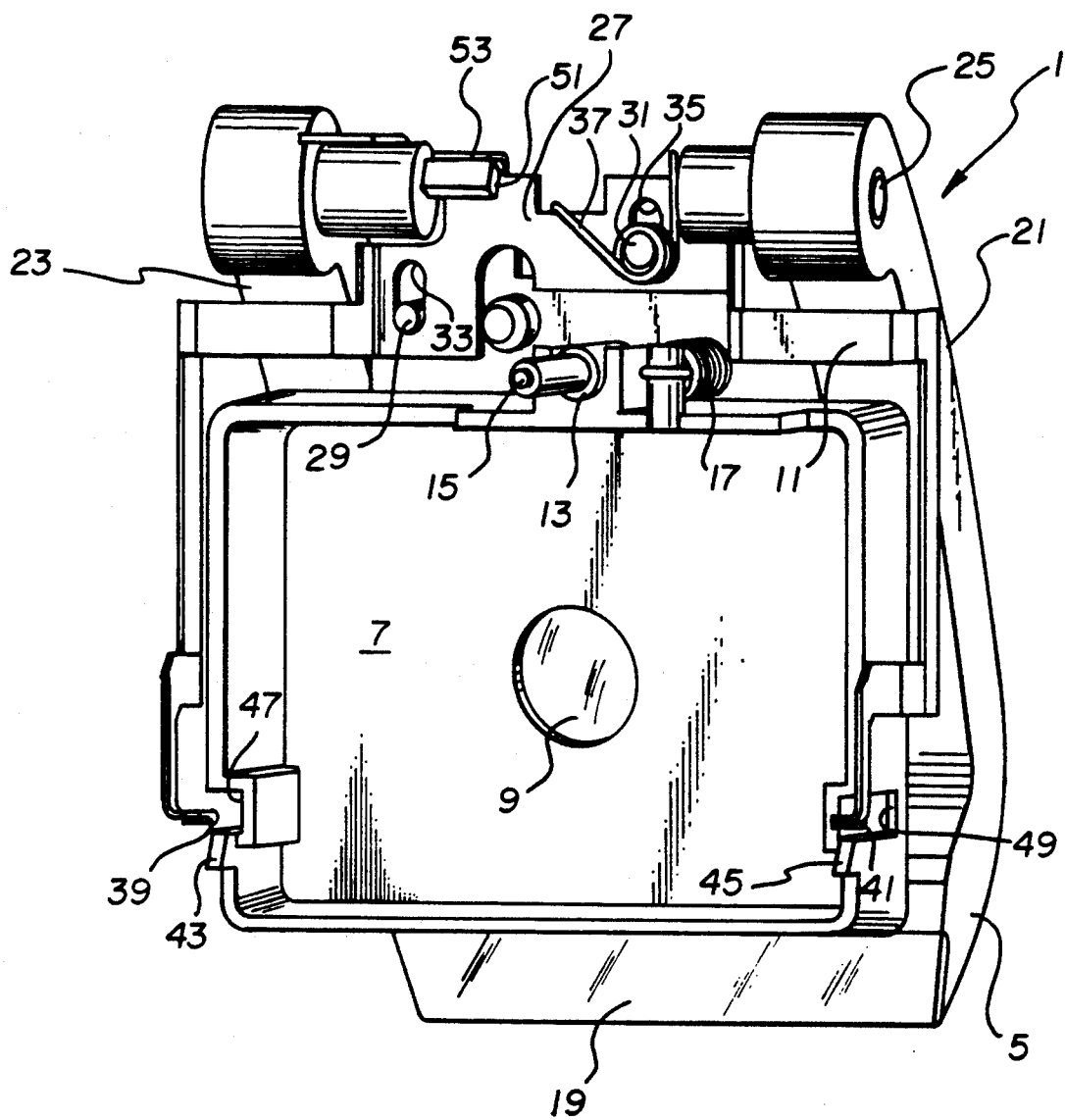
FIG. 4 is a front inside perspective view similar to FIG. 3.

A locking slide 27 is supported for vertical movement upwards and downwards in FIGS. 2 and 4 by a pair of pins 29 and 31, fixed to the frame portion 3, that extends through respective slots 33 and 35 in the locking slide. A torsional spring 37 encircles the pin 31 and is secured at opposite ends to the locking slide 27 and the frame portion 3 to bias the locking slide downwards as shown in FIGS. 1 and 2 to locate a pair of leg ends 39 and 41 of the locking slide in engagement with the lens carrier 7 at respective stops 43 and 45 of the lens carrier, when the lens carrier is in its extended taking position, thereby to lock the lens carrier in that position. The locking slide 27 can be moved upwards in FIG. 2, against the bias of the torsional spring 37, to align the leg ends 39 and 41 with respective slots or voids 37 and 29 in the lens carrier 7 to permit the lens carrier to be moved from its extended taking position to its storage position only because the slots 47 and 49 can receive the leg ends 39 and 41.

A single cam piece 51 is integrally formed with the arm 23 of the flash unit 5 to extend parallel, i.e. eccentrically, to the coaxial pivot pins 25. When the flash unit 5 is manually swung out of its opened position, the cam piece 51 is similarly swung in contact with a cam follower lip 53 of the locking slide 27 to lift the locking slide, against the bias of the torsional spring 37, only until the leg ends 39 and 41 of the locking slide are aligned with the slots 47 and 49 in the lens carrier 7. The, continued movement of the flash unit 5 to its closed positioned allows its rigid arms 21 and 23 to push the lens carrier 7 from its extended taking position to its retracted storage position, against the bias of the extension spring 17, since the slots 47 and 49 will receive the leg ends 29 and 41. See FIGS. 1-4. During the time the flash unit 5 is in its closed position and the lens carrier 7 is in its storage position, the cam piece 51 forcibly holds the locking slide 27 out of engagement with the lens carrier.

When the flash unit 5 is manually swung out of its closed position as shown in FIGS. 2 and 4, the extension spring 17 is free to urge the lens carrier 7 ends 39 and 41 of the locking slide 27 are clear of the slots 47 and 49 in the lens carrier 7, and the lens carrier is returned substantially to its extended taking position, swinging of the flash unit 5 into its opened position similarly swings the cam piece 51 in contact with the cam follower lip 53 to allow the torsional spring 37 to depress the locking slide 27 only until the leg ends 39 and 41 engage the lens carrier 7 at its stops 43 and 45, thereby to lock the lens carrier in its taking position.

The invention has been described with reference to a preferred embodiment. However, it will be appreciated that various modifications can be effected within the ordinary skill in the art without departing from the scope of the invention. For example, a flip open lens cover may be used in place of the flash unit 5.

We claim:

1. An improved photographic camera wherein a flip open unit is manually movable between an opened position and a closed position, a retractable objective lens carrier is associated with said flip open unit to move to an extended taking position as the flip open unit is moved to its opened position and to move to a retracted storage position as the flip open unit is moved to its closed position, and a single piece locking element is baised for movement to engage said lens carrier is in its taking position to lock the lens carrier in that position and can be moved to disengage from the lens carrier to permit the lens carrier to be moved to its storage position, and wherein the improvement comprises:

a single piece cam element is connected with said flip open unit and is in direct continuous contact with said locking element, due to said bias of the locking element, to move the locking element out of engagement with said lens carrier responsive to movement of the flip open unit out of its opened position and to forcibly hold the locking element separated from the lens carrier when the flip open unit is in its closed position, but to discontinue forcibly holding the locking element separated from the lens carrier responsive to movement of the flip open unit to its opened position to permit the locking element to move to engage the lens carrier when the lens carrier is in its taking position.

2. The improvement as recited in claim 1, wherein said single piece cam element is eccentric with respect to a pivot axis of said flip open unit.

3. The improvement as recited in claim 1, wherein said single piece cam element is shaped to align said single piece locking element with a void in said lens carrier as said flip open unit is moved out of its opened position to permit the locking element to be received in said void as the lens carrier is moved from its taking position to its storage position.

* * * * *

UNITED STATES PATENT AND TRADEMARK OFFICE
CERTIFICATE OF CORRECTION

PATENT NO. : 5,231,436
DATED : July 27, 1993
INVENTOR(S) : Glogan et al

It is certified that error appears in the above-indentified patent and that said Letters Patent is hereby corrected as shown below:

Col. 4, Line 23 "baised" should read --biased--

Signed and Sealed this

Eighth Day of March, 1994

Attest:

BRUCE LEHMAN

*Attesting Officer*  *Commissioner of Patents and Trademarks*